(12) United States Patent
Chikaoka et al.

(10) Patent No.: US 7,783,916 B2
(45) Date of Patent: Aug. 24, 2010

(54) OPTICAL DISC APPARATUS AND DATA COMPLEMENTATION METHOD

(75) Inventors: Atsuhiko Chikaoka, Osaka (JP); Tetsuya Shihara, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 414 days.

(21) Appl. No.: 11/902,954

(22) Filed: Sep. 26, 2007

(65) Prior Publication Data

US 2008/0089201 A1 Apr. 17, 2008

(30) Foreign Application Priority Data

Sep. 27, 2006 (JP) .............................. 2006-262629

(51) Int. Cl.
*G06F 11/00* (2006.01)
(52) U.S. Cl. ................. 714/5; 714/723; 369/53.17; 369/53.15
(58) Field of Classification Search .................. None
See application file for complete search history.

(56) References Cited

U.S. PATENT DOCUMENTS

| 5,721,741 | A * | 2/1998 | Deas ........................... 714/724 |
| 6,744,266 | B2 * | 6/2004 | Dor et al. ..................... 324/751 |
| 7,228,468 | B2 * | 6/2007 | Wu et al. ..................... 714/710 |
| 7,430,541 | B2 * | 9/2008 | Seo et al. ...................... 705/51 |
| 7,437,627 | B2 * | 10/2008 | Frankowsky ................ 714/711 |
| 7,590,901 | B2 * | 9/2009 | Kuo ............................ 714/724 |
| 2002/0072162 | A1 * | 6/2002 | Dor et al. .................... 438/200 |
| 2006/0092806 | A1 * | 5/2006 | Ohno ......................... 369/59.25 |
| 2006/0239161 | A1 * | 10/2006 | Takahashi et al. ......... 369/53.24 |
| 2007/0189143 | A1 * | 8/2007 | Sasaki ...................... 369/53.17 |
| 2008/0101188 | A1 * | 5/2008 | Hwang et al. ............. 369/53.17 |
| 2008/0189571 | A1 * | 8/2008 | Park et al. ...................... 714/2 |
| 2009/0034382 | A1 * | 2/2009 | Kaida et al. .............. 369/53.17 |

FOREIGN PATENT DOCUMENTS

| EP | 1164507 A2 * | 12/2001 |
| JP | A-2000-134583 | 5/2000 |
| JP | A-2002-049518 | 2/2002 |
| JP | T-2003-529118 | 9/2003 |
| WO | WO 00/63916 | 10/2000 |

* cited by examiner

*Primary Examiner*—Christopher S McCarthy
(74) *Attorney, Agent, or Firm*—Morgan Lewis & Bockius LLP (57) ABSTRACT

A data complementation method including a defective-data confirmation step of confirming if there is address information of defective data, a complementation-data confirmation step of confirming if complementation data is recorded, a complementation-data transmission request step of requesting a recovery server to transmit the complementation data, a complementation-data acquisition step of acquiring the complementation data through a communication network, and a complementation-data record step of recording the complementation data.

6 Claims, 6 Drawing Sheets

OPTICAL DISC APPARATUS AND DATA COMPLEMENTATION METHOD

This application is based on Japanese Patent Application No. 2006-262629 filed on Sep. 27, 2006, the contents of which are hereby incorporated by reference.

BACKGROUND OF THE INVENTION

1. Field of the Invention

The present invention relates to an optical disc apparatus which performs the record and reproduction of an optical disc such as CD or DVD and which complements the data of the unreproducible part of the optical disc, and a data complementation method for the optical disc apparatus.

2. Description of Related Art

Optical discs, such as a CD (Compact Disc) and a DVD (Digital Versatile Disc) having a record capacity larger than that of the CD, have been extensively adopted as the record media of video and audio data. Besides, a BD (Blu-ray Disc) which is still larger in the record capacity than the DVD has recently been developed and commercialized. There has come into wide use an optical disc apparatus which records data by projecting a laser beam onto the optical disc medium, or which reproduces data by sensing reflected light from the optical disc medium.

The above optical disc apparatus utilizing the optical disc as the record medium includes an optical pickup which records information on the optical disc medium such as CD, DVD or BD, by projecting the laser beam of a wavelength corresponding to the sort of the optical disc medium, and which reproduces information by sensing the reflected light from the optical disc medium.

In a case where a flaw or the like exists in the record surface or substrate of the optical disc medium, the optical disc apparatus cannot accurately read out data. With the optical disc apparatus, in a case where the readout of the optical disc medium is impossible, the unreadable part thereof is read out repeatedly a predetermined number of times. In a case where the readout is nevertheless impossible, the unreadable part is omitted, and the readout is restarted from the next part, or the readout is ended after indicating to the effect that the readout is impossible.

In this regard, an invention stated in JP-A-2000-134583 discloses a technique in which compressed data obtained by compressing original data are retained in a separate area of an optical disc, and unreadable original data (damaged data) is complemented and corrected with the compressed data.

Meanwhile, some of data which are offered by employing the optical disc medium need to be revised or updated as in an encyclopedia, "karaoke" (prerecorded background music), a map, or the like. There has also been developed an optical disc apparatus of the type adapted for a network, by which such data requiring the revision or updating as are recorded within the recordable optical disc medium can be revised or updated through the Internet or the like.

In a case where the data which needs to be revised/updated exists in the optical disc medium inserted in the optical disc apparatus of the network adaptation type, this optical disc apparatus is automatically or manually connected to a server installed on the network to download revision/updating data, and record the revision/updating data on the optical disc medium additionally or record the revision/updating data in substitution for the data which needs to be revised/updated (refer to, for example, JP-T-2003-529118 where the term "JP-T" means a published Japanese translation of a PCT patent application, and JP-A-2002-49518).

The prior-art techniques, however, have had disadvantages as described below. In the case of the invention stated in JP-A-2000-134583, the compressed data for the complementation need to be possessed, and the record area of the optical disc becomes smaller to the corresponding extent. Besides, in a case where the damage of data has occurred in an optical disc which does not possess the compressed data beforehand, the data complementation cannot be performed, and the optical disc apparatus cannot reproduce the damaged data just like the conventional optical disc apparatus.

Further, the optical disc apparatus which revises/updates the data through the network can perform the revision/updating of the data in the case where the recordable optical disc is inserted, but it cannot record the downloaded data in a case where a read-only optical disc is inserted. In a case, for example, where an optical disc on which map data for a navigation system have been recorded is the read-only optical disc, the revision/updating of the data cannot be performed through the network. Besides, when the data to be updated by the network becomes large, the load of the network becomes heavy disadvantageously.

SUMMARY OF THE INVENTION

An object of the present invention is to provide an optical disc apparatus in which an optical disc medium having damaged data that cannot be reproduced due to a flaw or the like can be reproduced by complementing the data of the corresponding part, and a data complementation method therefor.

Another object of the invention is to provide an optical disc apparatus which can precisely complement the damaged data of an optical disc medium and which can prolong the lifetime of the optical disc medium accordingly, and a data complementation method therefor.

Still another object of the invention is to provide an optical disc apparatus which complements damaged data via a network and which can reduce the load of the network during the data complementation, and a data complementation method therefor.

An optical disc apparatus in one aspect of the invention includes identification-information acquisition means for acquiring disc identification information of the optical disc; control means; and a database for defective data, in which optical disc addresses of unreadable defective data are stored for the respective disc identification information items, and complementation-data storage means for storing therein complementation data corresponding to the defective data, in linkage with the database for the defective data. Here, the control means searches the database for the defective data, on the basis of the identification information of the optical disc before the reproduction in a reproduction mode of the optical disc, so as to confirm if the address information of the defective data exists in that area of the optical disc which is to be read out from this time forth; and in a case where the address information of the defective data is contained in that area of the optical disc which is to be read out from this time forth, the content data is complemented with the complementation data which is previously recorded in the complementation-data storage means.

According to this configuration, the optical disc apparatus includes the database for the defective data and the complementation-data storage means, and the content data can be complemented using the database for the defective data and the complementation-data storage means.

Thus, the content data having any unreproducible part can be reproduced into the same or substantially the same state as the original data without omitting the unreproducible part or complementing it unreasonably.

This signifies that the contents can be precisely reproduced in spite of the occurrence of the unreproducible part in the optical disc, so that the reproduction lifetime of the optical disc can be lengthened.

The defective-data database and the complementation data may be generated by the optical disc apparatus, or may well be generated by another equipment.

In a preferred embodiment of the invention, when the control means has failed to read out the data of the optical disc a predetermined number of times or for a predetermined time period, it recognizes the data of the corresponding part as the unreadable defective data and records the optical disc address of the defective data in the database for the defective data.

According to this configuration, in a case where any defective data is always monitored and where new defective data exists on the optical disc, the address of the data is recorded on the database for the defective data. It is therefore possible to immediately search out at which position of the optical disc the defective data exists and how long the defective data is.

In a preferred embodiment of the invention, the optical disc apparatus includes network connection means for connecting the optical disc apparatus to a communication network; and a network-address database in which network addresses of recovery servers arranged on the communication network and for transmitting the complementation data are stored for the respective identification information items of the optical discs. Here, in a case where the control means searches the database for the defective data and where the complementation data corresponding to the defective data is not recorded in the complementation-data storage means, the control means detects the network address of the recovery server from the network-address database, requests the recovery server to transmit the complementation data on the basis of the network address and acquires the complementation data through the communication network.

According to this configuration, the complementation data for complementing the defective data can be acquired by utilizing the communication network. Therefore, even in the case where the new defective data has occurred, it can be complemented by acquiring the complementation data from the recovery server arranged on the network.

In a preferred embodiment of the invention, data can be recorded in the complementation-data storage means; and the control means records the complementation data acquired from the recovery server, in the complementation-data storage means in linkage with the address information of the database for the defective data.

In a preferred embodiment of the invention, the complementary-data record means includes a portable external memory, and the complementation data may well be data recorded by a different device. As the external memory, it is possible to exemplify a so-called "memory card" which is inserted into a memory slot formed beforehand, or a USB memory which is connected to a USB slot. Besides, the complementation-data record means includes an HDD.

An optical disc apparatus according to another aspect of the invention consists in an optical disc apparatus which includes network connection means for connecting the optical disc apparatus to a communication network; a portable external memory; identification-information acquisition means for acquiring disc identification information of the optical disc; and control means; and which can record and reproduce content data of an optical disc. The external memory contains therein a database for defective data, in which optical disc addresses of the defective data unreadable in reproduction modes of the optical discs are stored for the respective disc identification information items beforehand; a network address database which stores therein network addresses of recovery servers that are arranged on the communication network and that bear complementation data; and a complementation-data record area in which the complementation data are recorded in correspondence with the defective data and in linkage with the database for the defective data. Here, the control means searches the database for the defective data, on the basis of the identification information of the optical disc before the reproduction in the reproduction mode of the optical disc, so as to confirm if the address information of the defective data exists in that area of the optical disc which is to be read out from this time forth; the control means confirms if the complementation data corresponding to the defective data is recorded in the complementation-data record area, on the basis of the confirmed address information, and in a case where the complementation data is not recorded, the control means requests the recovery server to transmit the complementation data, on the basis of the recovery-server network address detected from the network address database and then acquires the complementation data through the communication network; the control means records the acquired complementation data in the data record area in linkage with the database for the defective data; in a case where the address information of the defective data is contained in that area of the optical disc which is to be read out from this time forth, the control means complements the content data with the complementation data recorded in the complementation-data record area beforehand or with the complementation data acquired from the recovery server; and when the control means has failed to read out the data of the optical disc a predetermined number of times or for a predetermined time period, it recognizes the data of the corresponding part as unreadable defective data and then records the optical disc address of the defective data in the database for the defective data, together with the identification information of the optical disc.

A data complementation method according to still another aspect of the invention consists in a data complementation method for an optical disc in which unreproducible defective data of the optical disc whose data have become partly unreadable is complemented and reproduced, in an optical disc apparatus having identification-information acquisition means for acquiring disc identification information of the optical disc, a database for defective data, in which addresses of unreadable defective data on the optical discs are stored for the respective disc identification information items, and complementation-data storage means in which complementation data corresponding to the defective data are stored in linkage with the database for the defective data, characterized by including a defective-data confirmation step of searching a database for defective data, on the basis of the identification information of the optical disc before the reproduction of a reproduction mode of the optical disc, so as to confirm if the address information of the defective data exists in that area of the optical disc which is to be read out from this time forth; and a data complementation step of complementing the content data with complementation data previously recorded in complementation-data storage means, in a case where the address information of the defective data is contained in that area of the optical disc which is to be read out from this time forth.

According to this method, the content data can be complemented using the database for the defective data and the complementation-data storage means.

Thus, the content data having any unreproducible part can be reproduced into the same or substantially the same state as the original data without omitting the unreproducible part or complementing it unreasonably.

This signifies that the contents can be precisely reproduced in spite of the occurrence of the unreproducible part in the optical disc, so that the reproduction lifetime of the optical disc can be lengthened.

In a preferred embodiment of the invention, the data complementation method includes a defective-data detection step of detecting the defective data of the optical disc; and a database record step of recording the optical-disc address of the defective data in the database for the defective data.

According to this configuration, in a case where any defective data is always monitored and where new defective data exists on the optical disc, the address of the data is recorded on the database for the defective data. It is therefore possible to immediately search out at which position of the optical disc the defective data exists and how long the defective data is.

In a preferred embodiment of the invention, the data complementation method includes a complementation-data acquisition step of acquiring the complementation data from a recovery server arranged on the network, in a case where the database for the defective data is searched and where the complementation data corresponding to the defective data is not recorded in the complementation-data storage means.

In a preferred embodiment of the invention, the data complementation method includes a complementation-data record step of recording the complementation data acquired at the data acquisition step, in the complementation-data storage means in linkage with the address information of the database for the defective data.

A data complementation method according to yet another aspect of the invention consists in a data complementation method for an optical disc in which unreproducible defective data of the optical disc whose data have become partly unreadable is complemented and reproduced, in an optical disc apparatus having network connection means for connecting the optical disc apparatus to a communication network, identification-information acquisition means for acquiring disc identification information of the optical disc, a database for defective data, in which addresses of unreadable defective data on the optical discs are stored for the respective disc identification information items, a network address database which stores therein network addresses of recovery servers that are arranged on the communication network and that bear complementation data, and a complementation-data record area in which complementation data corresponding to the defective data are stored in linkage with the database for the defective data. The data complementation method includes a defective-data confirmation step of searching the database for the defective data, on the basis of the identification information of the optical disc before the reproduction of a reproduction mode of the optical disc, so as to confirm if the address information of the defective data exists in that area of the optical disc which is to be read out from this time forth; a complementation-data confirmation step of confirming if the complementation data corresponding to the defective data is recorded in the complementation-data record area, on the basis of the address information confirmed at the defective-data confirmation step; a complementation-data transmission request step of requesting a recovery server to transmit the complementation data, on the basis of the network address of the recovery server as has been detected from the network address database; a complementation-data acquisition step of acquiring the complementation data through the communication network; a complementation-data record step of recording the complementation data acquired at the data acquisition step, in the data record area in linkage with the database for the defective data; a data complementation step of complementing the content data with the complementation data previously recorded in the complementation-data record area or with the complementation data acquired from the recovery server, in a case where the address information of the defective data is contained in that area of the optical disc which is to be read out from this time forth; and a database record step of recognizing the data of the corresponding part as unreadable defective data when the readout of the data of the optical disc has failed a predetermined number of times or for a predetermined time period, and then recording the optical disc address of the defective data in the database for the defective data, together with the identification information of the optical disc.

DESCRIPTION OF THE PREFERRED EMBODIMENTS

Figure 1:
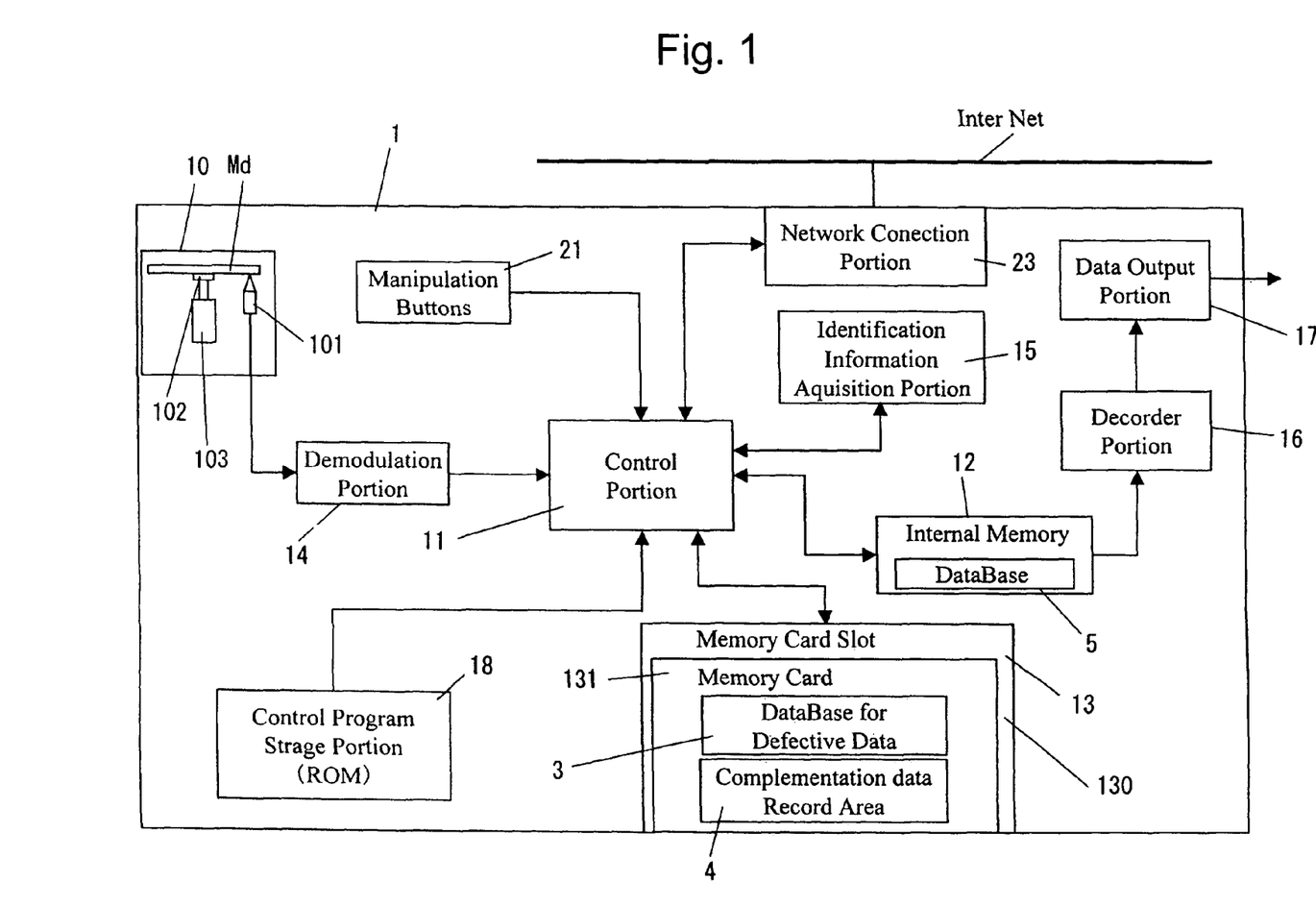
FIG. 1 is a block diagram of an example of a DVD player which is an optical disc apparatus according to the present invention.

Embodiments of the present invention will be described with reference to the drawings. FIG. 1 is a block diagram of a DVD player which is an example of an optical disc apparatus according to the invention.

As shown in the block diagram of FIG. 1, the DVD player 1 in the invention is configured so as to include, at least, a DVD unit 10, a control portion 11, an internal memory 12, an external memory 13, a demodulation portion 14, an identification information acquisition portion 15, a decoder portion 16, a data output portion 17, a control program storage portion 18, manipulation buttons 21, and a network connection portion 23.

The DVD unit 10 includes an optical pickup 101 which projects a laser beam onto a DVD medium Md and which detects reflected light, a turntable 102 which holds the DVD medium Md, and a drive motor 103 which turns the turntable 102. The optical pickup 101 and the drive motor 103 are controlled by the control portion 11. The light detected by the optical pickup 101 is converted into an electric signal by a photoreceiver (not shown) included in this optical pickup 101, and the electric signal is sent to the demodulation portion 14.

The control portion 11 is a central processor for organically controlling the drives of the various portions of the DVD player 1, thereby to generally control video information processing (the record or reproduction of contents, etc.). Besides, the control portion 11 forms a core portion which performs the controls of the various devices (for example, the DVD unit 10), and the computations, working processing, etc. of data. The control portion 11 includes an arithmetic device, for example, a microcomputer or a CPU.

The internal memory 12 is a medium in which various data held by the DVD player 1 are temporarily stored, and it is configured of, for example, a writable RAM (Random Access Memory). This internal memory 12 functions as a buffer memory for temporarily storing therein, for example, processing data which are used in the various information processing to be executed by the control portion 11, and a database 5 which saves data from the external memory 13.

The external memory 13 is a memory card 131 which is inserted into a memory card slot 130, and it is a record medium which serves to record various data (video information, content information, etc.) concerning the DVD player 1. A nonvolatile memory such as flash memory can be mentioned as the external memory 13.

The demodulation portion 14 demodulates the electric signal sent from the optical pickup 101, and it includes an A/D converter for converting analog data into digital data. The data demodulated by the demodulation portion 14 are sent to the control portion 11.

The DVD medium Md bears identification information for specifying the medium (hereinbelow, termed the "disc ID"), and the identification information acquisition portion 15 acquires the disc ID contained in the data sent to the control portion 11, from these data.

The decoder portion 16 is a processing circuit for expanding (decoding) compressed video data and audio data. Expanded data are outputted to an external equipment by using, for example, the data output portion 17 to be stated later.

The data output portion 17 is an output interface for outputting the video data and audio data to an external device, for example, a monitor. By the way, in a case where the equipment of an output destination includes only an analog interface, the digital video data and audio data can be converted into analog data by employing a D/A converter so as to output the analog data.

The control program storage portion 18 is a medium in which, for example, program data for executing various processes with the control portion 11 (for example, the input/output controls of the video data) are stored. By way of example, a ROM (Read Only Memory) capable of only the readout of information is employed as the control program storage portion 18.

The manipulation buttons 21 constitute an input interface through which a user gives various instructions to the DVD player 1.

The network connection portion 23 serves to connect the DVD player 1 to a communication network such as the Internet. This network connection portion 23 is connected to a recovery server which is arranged on the network and from which complementation data corresponding to defective data to be stated later can be acquired. Thus, it requests the recovery server to transmit the complementation data.

The DVD player 1 can reproduce the data recorded on the DVD medium Md, by projecting the laser beam onto this DVD medium Md and reading the reflected light. The DVD medium Md has addresses which designate the positions of data on this DVD medium Md. The DVD player 1 determines the positions of the reproduction start point and reproduction end point of the data on the basis of the addresses. Also in an optical disc such as a CD or a BD, the positions of data are designated by addresses.

When the surface of the DVD medium Md flaws, the laser beam is refracted or is irregularly reflected by the flaw, and the data recorded on the record surface of the DVD medium Md cannot be accurately read out. Besides, apart from the flaw, the data cannot be accurately read out on account of any damage existing in the record surface itself, the deformation of the DVD medium, or the like. A method for confirming if the data read out is accurate data, is an error check method having heretofore been well known, and its detailed description shall be omitted.

As stated above, the DVD medium Md has the positions of the data identified by the addresses. It is therefore possible to detect the start address and end address of data (hereinbelow, termed the "defective data") which has failed to be accurately read out due to the flaw or the like in the reproduction of the medium.

The external memory 13 includes a database for the defective data 3 in which the addresses of the defective data are stored every identification information (disc ID) of the DVD medium Md. Besides, this external memory 13 includes a complementation data record area 4 in which content data (hereinbelow, termed the "complementation data") corresponding to the defective data are recorded. Further, it includes a complementation data information table 32 listing those network addresses of the server from which the complementation data for the disc ID of the DVD medium Md are transmitted.

Figure 2:
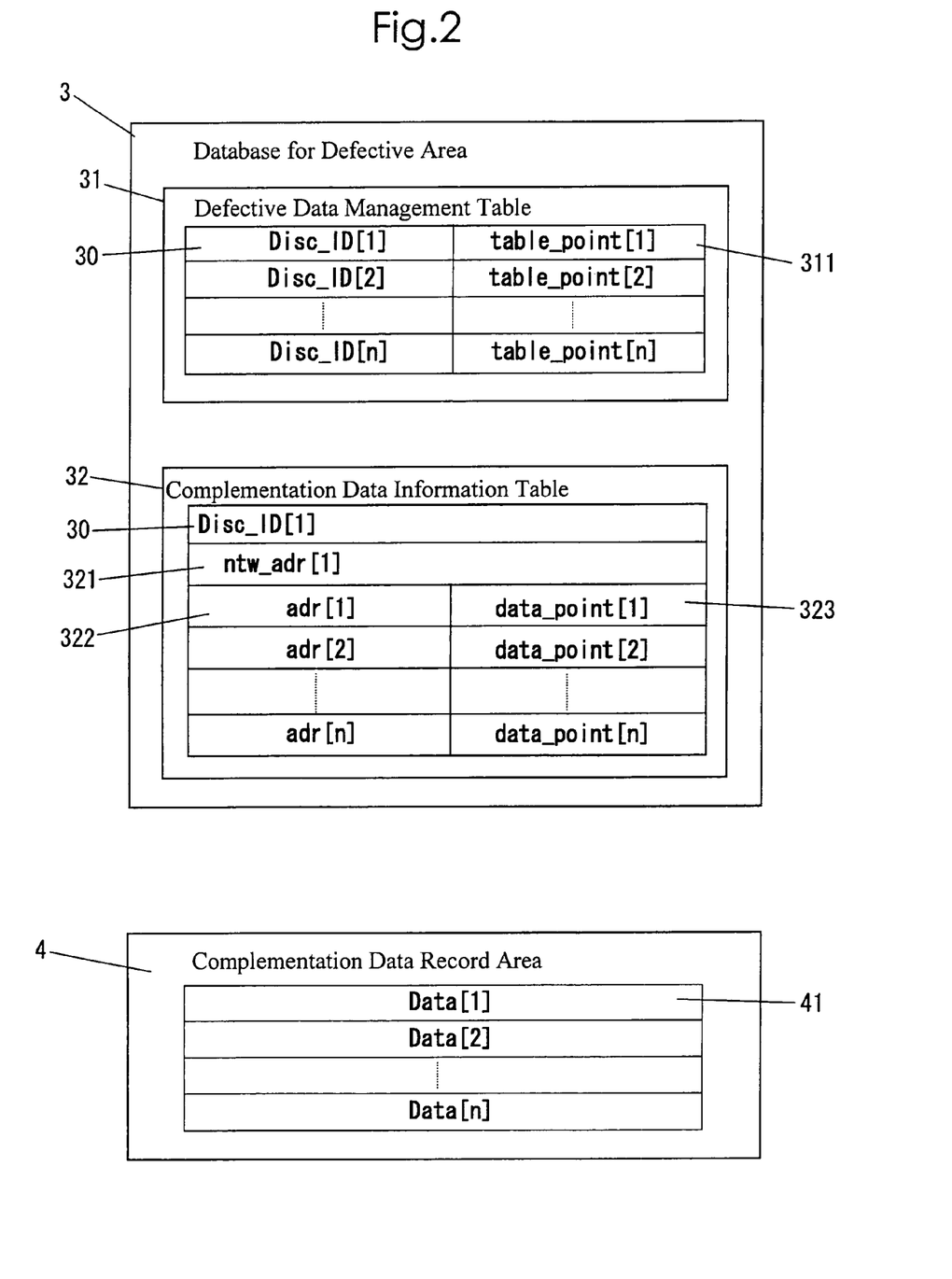
FIG. 2 is a conceptual diagram of a database for defective data, stored in an external memory, and complementation data recorded in the external memory.
Figure 3:
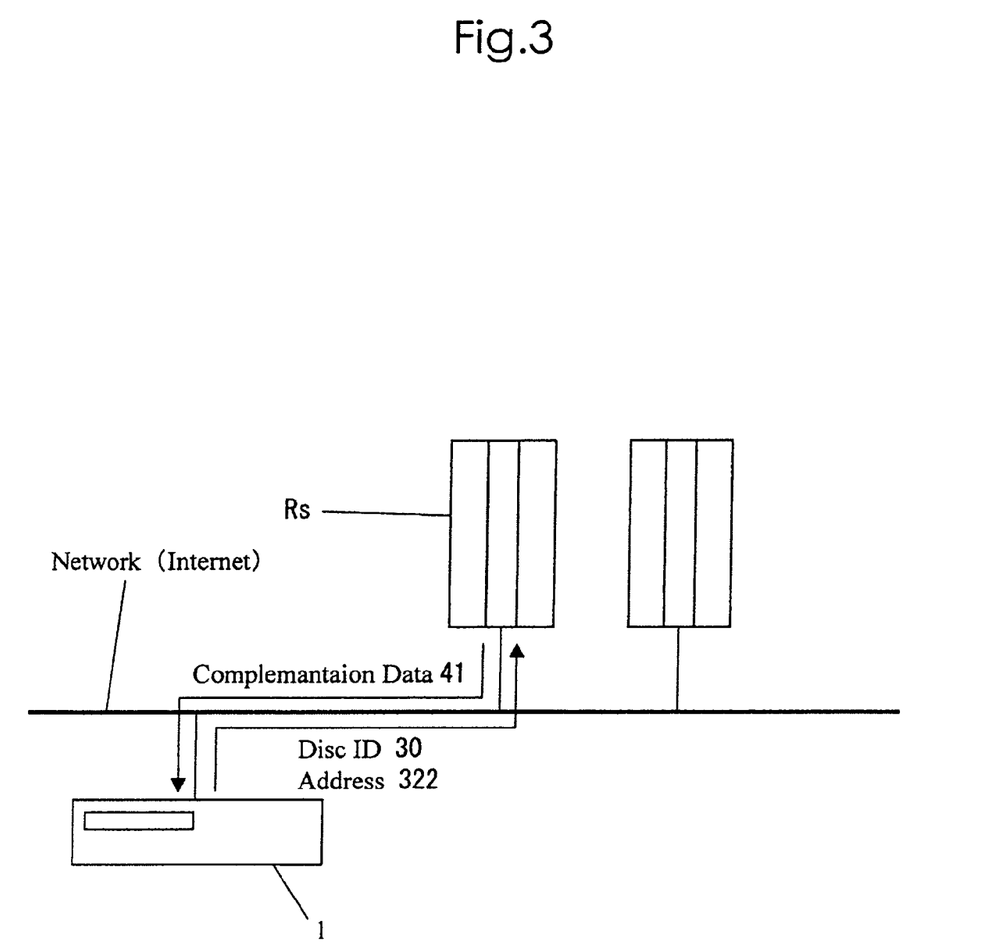
FIG. 3 is a conceptual diagram of network connection.

FIG. 2 is a conceptual diagram of the database for the defective data, stored in the external memory, and the complementation data recorded in the external memory, while FIG. 3 is a conceptual diagram of the network connection. As shown in FIG. 2, the database for the defective data 3 includes a defective data management table 31 which stores therein the disc IDs (Disc_ID[n]: n being serial Nos.) 30, and defective data numbers (table_point[n]: n being serial Nos.) 311 each indicating the number of the defective data of the DVD medium Md of the corresponding ID 30.

Besides, the database for the defective data 3 includes the complementation data information table 32 which stores therein the network addresses (ntw_adr[n]: n being serial Nos.) 321 of the recovery servers where the complementation data of the respective disc IDs 30 can be acquired, as well as addresses (adr[n]: n being serial Nos.) 322 where the defective data are recorded, and the save place data (data_point[n]: n being serial Nos.) 323 of the complementation data within the external memory 13. The start address and end address of the corresponding defective data are stated in the addresses 322 of the defective data though this aspect is not restrictive. Each of the save place data 323 of the complementation data is blank in a case where the corresponding complementation data is not recorded in the external memory 13. However, this aspect is not restrictive, but predetermined specific data may well be assigned in the case where the complementation data is not saved.

As shown in FIG. 2, the complementation data information table 32 is a data table which is formed every disc ID. Further, the external memory 13 includes the complementation data record area 4 in which the complementation data (data[n]: n being serial Nos.) 41 are recorded, in addition to the defective data management table 31 and the complementation data information table 32. Also this complementation data record area 4 is formed every disc ID.

In FIG. 2, one network address 321 is assigned to the disc ID 30, but a plurality of network addresses may well be assigned. Connections to a plurality of servers are permitted by assigning the plurality of network addresses 321, so that a situation where the DVD player 1 cannot be connected to the server is easily avoided. Examples of the network address 321 are those of a server which is prepared by the manufacturer of the DVD medium Md, and a server which is prepared by a provider that provides the data recorded on the DVD medium Md. However, these network addresses are not restrictive, but network addresses which can provide the complementation data are extensively adoptable.

As shown in FIG. 3, the DVD player 1 is connected to the network (here, the Internet) through the network connection portion 23. The DVD player 1 transmits the disc ID 30 and the address data 322 to the recovery server Rs, and it requests the recovery server Rs to transmit the complementation data 41. The recovery server Rs transmits the complementation data 41 to the DVD player 1 on the basis of the disc ID 30 and the address data 322.

The internal memory 12 includes the database 5 for temporarily saving therein the disc ID 30, the address 322 on the disc, the network address 321, and the save place data 323 of the complementation data in the external memory 13.

Figure 4:
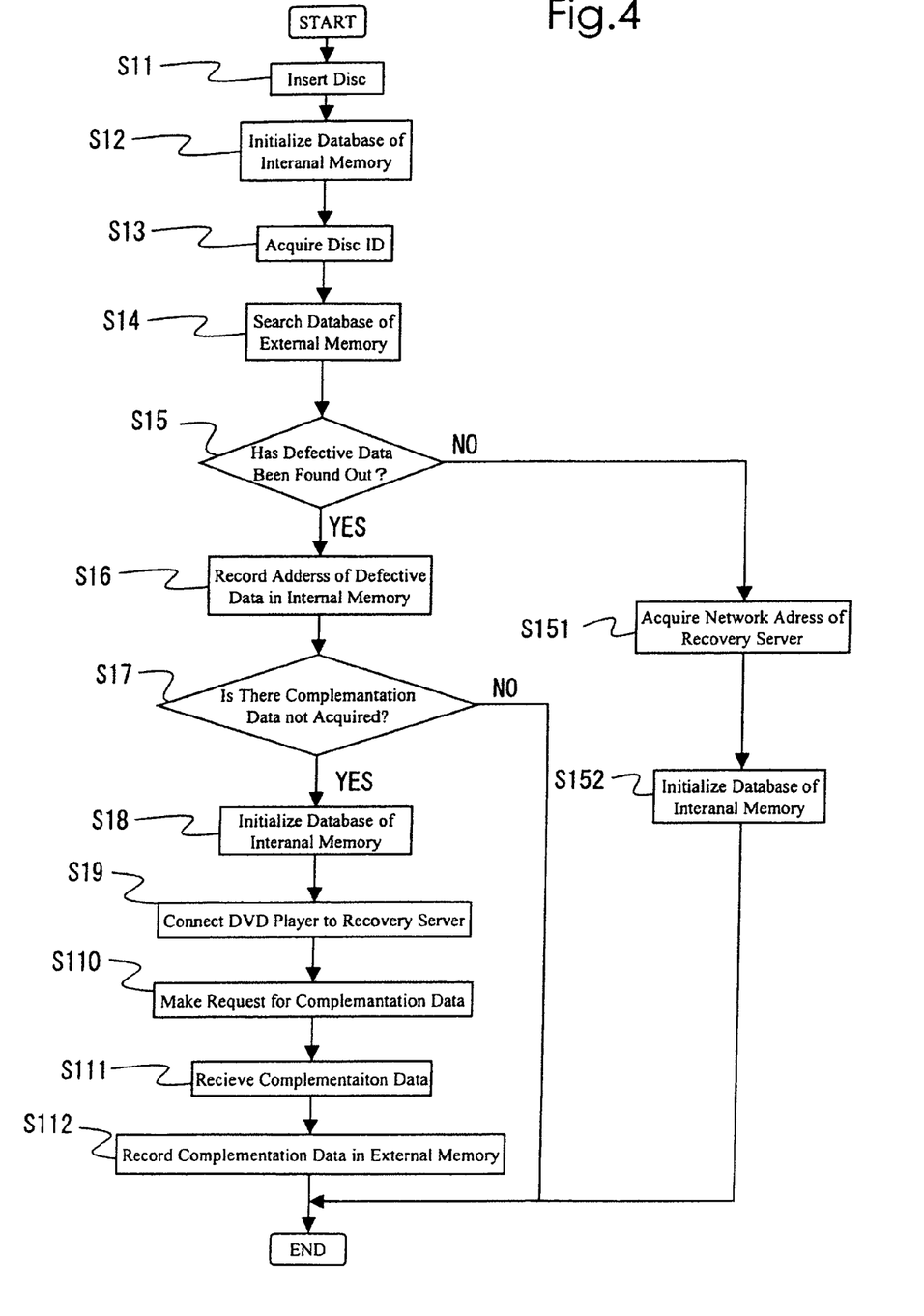
FIG. 4 is a flow chart at the time when data is complemented by the optical disc apparatus according to the invention.

FIG. 4 is a flow chart at the time when data is complemented in the optical disc apparatus according to the invention. The optical disc apparatus described in the flow chart shown in FIG. 4 is the DVD player 1, and the reference numerals and sign of the respective portions are the same as in the DVD player 1 shown in FIG. 1. The flow chart of FIG. 4 shows a process which is executed before the reproduction process of the DVD medium Md. First, at the same time that the DVD medium Md is inserted into the DVD player 1, the control portion 11 executes preprocessing (step S11). The preprocessing is processing necessary for reading out data recorded on the DVD medium Md, for example, clamp processing for clamping the inserted DVD medium Md by the turntable 102, and processing for moving the optical pickup 101 to a predetermined initial position.

The control portion 11 initializes the database 5 included in the internal memory 12 (step S12). The information of the defective data of an optical disc reproduced before can be erased by initializing the database 5.

Upon receiving an instruction from the control portion 11, the identification information acquisition portion 15 acquires the disc ID 30 of the DVD medium Md (step S13). The control portion 11 searches the defective data management table 31 of the database for the defective data 3, recorded in the external memory 13, on the basis of the disc ID 30, so as to detect the defective data number 311 (step S14). Further, the control portion 11 decides if the defective data number 311 is zero (step S15). In a case where the defective data number 311 is zero (in case of "NO" at the step S15), the control portion 11 acquires the network address 321 of the recovery server Rs corresponding to the disc ID 30 of the inserted DVD medium Md, from the complementation data information table 32, and it records the network address 321 in the internal memory 12 (step S151). Thereafter, the control portion 11 initializes the database 5 of the internal memory 12 (step S152) and shifts to a reproduction process (refer to FIG. 5).

Besides, in a case where the defective data number 311 is not zero (in case of "YES" at the step S15), the control portion 11 acquires the complementation data information table 32 of the database for the defective data 3, and it records the acquired table in the database 5 of the internal memory 12 (step S16). Subsequently, the control portion 11 refers to the database 5 of the internal memory 12 and checks if there is any address 322 for which the save place data 323 of the complementation data is nonexistent (step S17). In a case where there is not the address 322 for which the save place data 323 is nonexistent (in case of "NO" at the step S17), the control portion 11 acquires the network address 321 of the recovery server Rs and records the acquired address in the internal memory 12, and it shifts to the reproduction process (refer to FIG. 5).

In a case where there is the address 322 for which the save place data 323 is nonexistent (in case of "YES" at the step S17), the control portion 11 acquires the network address 321 of the recovery server Rs on the basis of the disc ID 30 and records the acquired address in the internal memory 12 (step S18). Subsequently, the control portion 11 connects the DVD player 1 to the recovery server Rs on the basis of the network address 321 and the address 322 for which the save place data 323 is nonexistent (step S19). Then, the control portion 11 transmits the disc ID 30 and the address 322 of the defective data to the recovery server Rs, and it requests the recovery server Rs to transmit the complementation data corresponding to the defective data (step S10).

The complementation data transmitted from the recovery server Rs is received by the network connection portion 23, and is sent to the control portion 11 (step S111). The control portion 11 records the complementation data in the complementation data record area 4 of the external memory 13, and it also records the save place data 323 of the recorded complementation data in the complementation data information table 32 in association with the address 322 (step S112). Thereafter, the control portion 11 shifts to the reproduction process (refer to FIG. 5).

Figure 5:
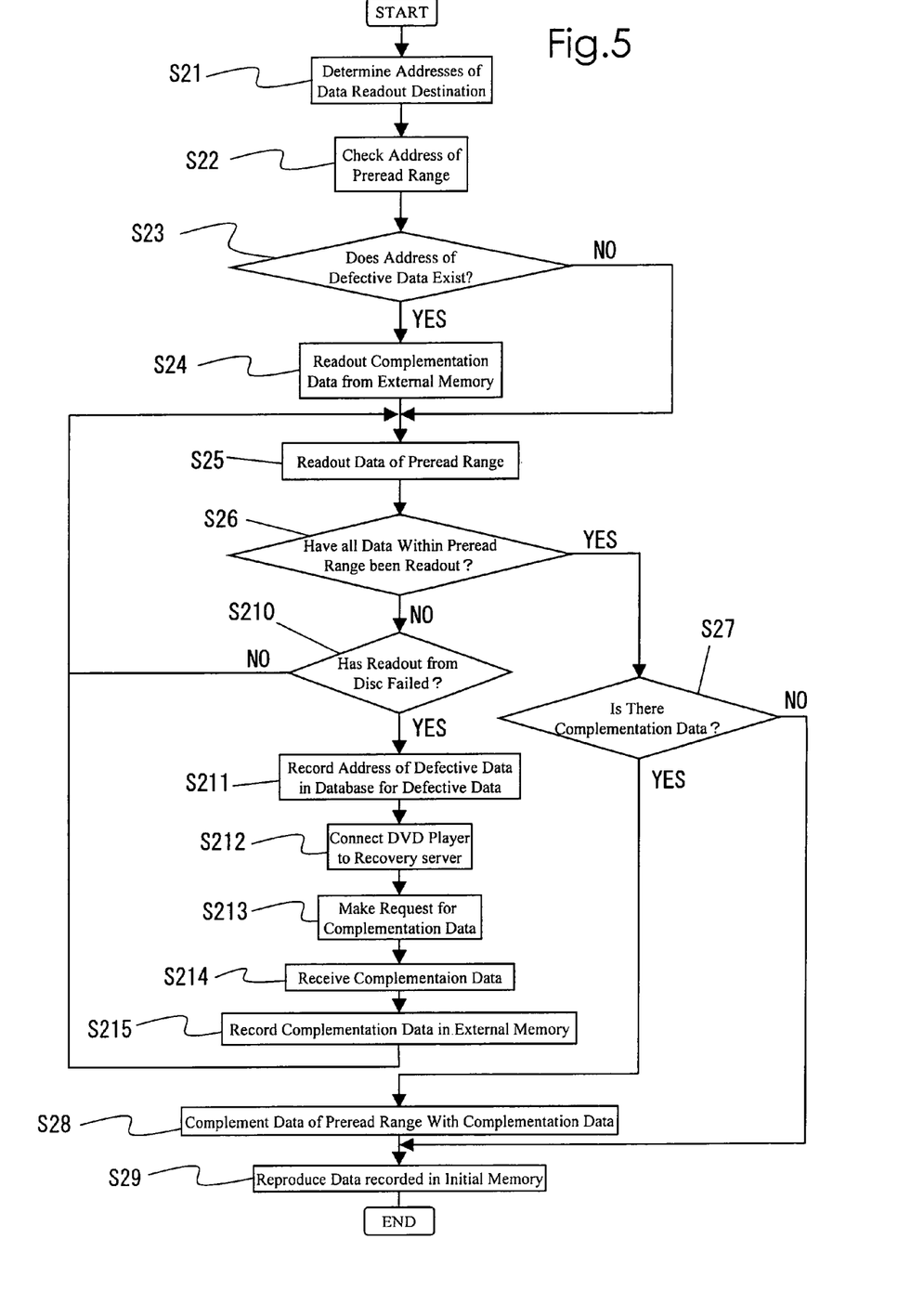
FIG. 5 is a flow chart at the time when an optical disc is reproduced by the optical disc apparatus according to the invention.

FIG. 5 is a flow chart at the time when the optical disc is reproduced by the optical disc apparatus according to the invention. The optical disc apparatus described in the flow chart shown in FIG. 5 is the DVD player 1, and the reference numerals and signs of the respective portions are the same as in the DVD player 1 shown in FIG. 1. FIG. 5 corresponds to a state after the process before the reproduction as shown in FIG. 4 has been executed (especially, the states of the internal memory 12 and the external memory 13). When the DVD medium Md is reproduced, the DVD player 1 stores previously read-out data in the internal memory 12, and it outputs the data to a monitor or the like being an external equipment, through the decoder portion 16 and the data output portion 17.

Besides, the control portion 11 determines the addresses of data to-be-read-out (step S21). These addresses are the addresses of the data which are reproduced from this time forth, for example, addresses which are previously set on the DVD medium Md, or addresses at which the data designated to be reproduced, by the user are recorded. As stated above, the DVD player 1 performs so-called "preread" in which the previously read-out data are recorded in the internal memory 12, and the control portion 11 detects addresses in the range of the preread (step S22). The range of the preread depends upon the capacity of the internal memory 12 here though this aspect is not restrictive.

The control portion 11 checks if the address 322 of defective data recorded in the database 5 of the internal memory 12 exists in the range of the preread (step S23). In a case where the address 322 of the defective data does not exist (in case of "NO" at the step S23), the control portion 11 manipulates the optical disc unit 10, and it reads out the readable data of the preread range of the optical disc in accordance with the addresses detected at the step S22 and records the read-out data in the internal memory 12 (step S25).

In a case where the address 322 of the defective data exists (in case of "YES" at the step S23), the control portion 11 fetches the save place data 323 of complementation data from the complementation data information table 32 on the basis of the address 322 of the defective data, and it reads out the complementation data on the basis of the save place data 323 and records the read-out complementation data in the internal memory 12 (step S24). Thereafter, the control portion 11 reads out the readable data of the preread range and records the read-out data in the internal memory 12, just as in the case where the address 322 of the defective data does not exist (step S25).

The control portion 11 checks if all the data within the preread range of the DVD medium Md have been read out (step S26). In a case where any range not read out yet does not exist within the preread range (in case of "YES" at the step S26), the control portion 11 confirms if there is complementation data in the internal memory 12 (step S27). In a case where there is not the complementation data (in case of "NO" at the step S27), the data recorded in the internal memory 12 are reproduced (step S29). In a case where there is the complementation data (in case of "YES" at the step S27), the data recorded in the internal memory 12 are complemented with the complementation data on the basis of the address (step S28) and are then reproduced (step S29).

In a case where any data not read out yet exists (in case of "NO" at the step S26), the control portion 11 checks if there is any unreadable part within the preread range of the optical disc (step S210). In a case where there is not the unreadable part (in case of "NO" at the step S210), the control portion 11 returns to the step S25 and continues the readout of the preread range. In a case where there is the unreadable part (in case of "YES" at the step S210), the control portion 11 adds the address of the unreadable data into the database 5 of the internal memory 12 and the complementation data information table 32 of the external memory 13 as the address 322 of defective data (step S211).

The control portion 11 connects the DVD player 1 to the recovery server Rs on the communication network, through the network connection portion 23 on the basis of that network address 321 of the recovery server Rs which has been recorded in the internal memory 12 at the preprocessing stage shown in FIG. 4 (step S212). Subsequently, the control portion 11 sends the disc ID 30 and the address 322 added into the database 5 of the internal memory 12, to the recovery server Rs through the network connection portion 23, and it requests the recovery server Rs to transmit the complementation data (step S213).

The complementation data sent from the recovery server Rs is received by the network connection portion 23, and is sent to the control portion 11 (step S214). The control portion 11 records the complementation data in the internal memory 12 and also in the complementation data record area 4 of the external memory 13, and it records the save place data 323 of the complementation data in the complementation data information table 32 in association with the address 322 (step S215). Thereafter, the control portion 11 returns to the step S25 and continues the readout of the preread range.

The DVD player 1 can reproduce the content data while complementing the defective data with the complementation data, by repeating the above processing.

Figure 6:
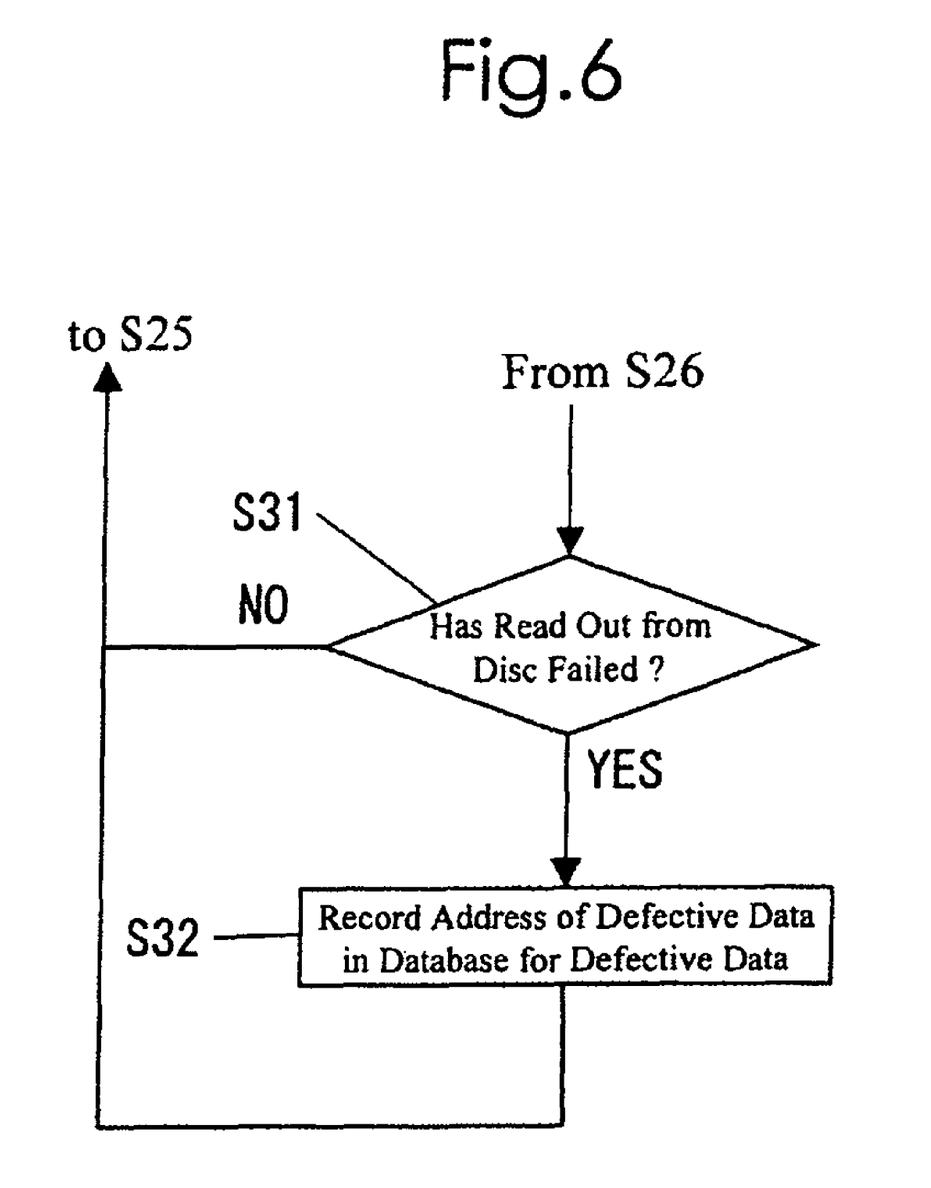
FIG. 6 is a flow chart at the time when an optical disc is reproduced by an optical disc apparatus which cannot be connected to a network.

FIG. 6 is a flow chart at the time when an optical disc is reproduced by an optical disc apparatus which cannot be connected to a network. The data reproduction shown in FIG. 6 can be executed in substitution for the steps S210-S215 in FIG. 5, and only a part which is substituted for the steps S210-S215 is shown for the sake of convenience.

The control portion 11 checks if there is any unreadable part within the preread range of the optical disc (step S31). In a case where there is not the unreadable part (in case of "NO" at the step S31), the control portion 11 continues the readout of the preread range (step S25). In a case where there is the unreadable part (in case of "YES" at the step S31), the control portion 11 adds the address of the unreadable data into the database 5 of the internal memory 12 and the complementation data information table 32 of the external memory 13 as the address 322 of defective data (step S32). Thereafter, the control portion 11 returns to the step S25 and restarts the readout.

Even when the DVD player 1 includes the network connection portion 23, a similar manipulation can be performed in a case where the network is down or where the connection to the server is impossible.

In this reproduction process, the network connection is not performed. Therefore, when new defective data has been found out, new complementation data cannot be recorded in the complementation data record area 4, but that place of the DVD medium Md in which the new defective data exists can be recorded in the complementation data information table 32 of the database for the defective data 3.

The external memory 13 may well be connected to an external equipment connectible to the network, for example, a PC, so as to acquire the complementation data through the external equipment. In this case, even the DVD player which cannot be connected to the network can complement the new defective data. Besides, since the DVD player 1 need not be connected to the network, the entanglement of the lines of the network can be suppressed.

As indicated above, even in a case where the DVD medium Md has a flaw or the like and it has any unreadable part, the DVD player 1 can reproduce data by complementing the unreadable part on the basis of complementation data recorded in the external memory 13. Besides, the external memory 13 is employed and can be carried simultaneously with the DVD medium Md, so that even when the individual of the DVD player 1 has changed, the defective data can be complemented without connecting the DVD player 1 to the network. According to this measure, the defective data can be complemented even in the DVD player which cannot be connected to the network.

Besides, since the complementation data can be obtained by utilizing the communication network, the data can be conveniently complemented, and the reproduction lifetime of the DVD medium can be prolonged accordingly.

In the DVD player described above, the database for the defective data 3, the complementation data information table 32 and the complementation data record area 4 have been exemplified as being disposed in the external memory 13. However, this aspect is not restrictive, but the constituents 3, 32 and 4 may well be disposed in an HDD or the like record device included in the DVD player 1. In this case, the HDD is lower in the unit price per capacity as compared with the external memory 13, and the record quantity of complementation data can be enlarged inexpensively.

It is also allowed to employ both the external memory 13 and the HDD. In this case, even the external memory 13 of small capacity is utilizable when it is utilized in case of carrying the database for the defective data 3, the complementation data information table 32 and the complementation data record area 4, simultaneously with the DVD medium Md.

In this embodiment, the DVD medium has been exemplified as the optical disc medium. However, the DVD medium is not restrictive, but other disc record media such as a CD, DVD and a BD can also be extensively adopted. Besides, the DVD player has been exemplified as the optical disc apparatus, separately. However, the DVD player is not restrictive, but other apparatuses capable of reproducing the disc record media, such as a CD player, a DVD recorder, a BD player and a BD recorder can also be mentioned as the optical disc apparatuses. Further, the optical disc apparatus may well be capable of recording or reproducing data on or from a plurality of sorts of disc record media.

While the several embodiments have been concretely described above, the present invention is not restricted to the foregoing embodiments, but it is variously alterable within a scope not departing from the purport thereof. Two or more of features stated in the individual embodiments may well be combined.

What is claimed is:

1. An optical disc apparatus which records and reproduces content data of an optical disc, comprising:
   identification-information acquisition means for acquiring disc identification information of the optical disc;
   control means; and
   complementation-data storage means including a database for defective data in which optical disc addresses of unreadable defective data are stored for the respective disc identification information items, and for storing therein complementation data corresponding to the defective data, in linkage with said database for the defective data;
   characterized in that:
   said control means searches said database for the defective data, on the basis of the identification information of the optical disc before the reproduction in a reproduction mode of the optical disc, so as to confirm if the address information of the defective data exists in that area of the optical disc which is to be read out from this time forth; and
   in a case where the address information of the defective data is contained in that area of the optical disc which is to be read out from this time forth, the content data is complemented with the complementation data which is previously recorded in said complementation-data storage means,
   wherein, when said control means has failed to read out the data of the optical disc a predetermined number of times or for a predetermined time period, it recognizes the data of the corresponding part as the unreadable defective data and records the optical disc address of the defective data in said database for the defective data.

2. An optical disc apparatus as defined in claim 1, further comprising:
   network connection means for connecting the optical disc apparatus to a communication network; and
   a network-address database in which network addresses of recovery servers arranged on the communication network and for transmitting the complementation data are stored for the respective identification information items of the optical discs;
   characterized in that:
   in a case where said control means searches said database for the defective data and where the complementation data corresponding to the defective data is not recorded in said complementation-data storage means, said control means detects the network address of the recovery server from said network-address database, requests the recovery server to transmit the complementation data on the basis of the network address and acquires the complementation data through the communication network.

3. An optical disc apparatus as defined in claim 2, wherein:
   said complementation-data storage means is capable of recording data; and
   said control means records the complementation data acquired from the recovery server, in said complementation-data storage means in linkage with the address information of said database for the defective data.

4. An optical disc apparatus as defined in claim 1, wherein said complementary-data storage means includes a portable external memory.

5. An optical disc apparatus which can record and reproduce content data of an optical disc, comprising:
   network connection means for connecting the optical disc apparatus to a communication network;
   a portable external memory;
   identification-information acquisition means for acquiring disc identification information of the optical disc; and
   control means;
   said external memory containing therein:
   a database for defective data, in which optical disc addresses of the defective data unreadable in reproduction modes of the optical discs are stored for the respective disc identification information items beforehand;
   a network address database which stores therein network addresses of recovery servers that are arranged on the communication network and that bear complementation data; and
   a complementation-data record area in which the complementation data are recorded in correspondence with the defective data and in linkage with said database for the defective data; characterized in that:
   said control means searches said database for the defective data, on the basis of the identification information of the optical disc before the reproduction in the reproduction mode of the optical disc, so as to confirm if the address information of the defective data exists in that area of the optical disc which is to be read out from this time forth;
   said control means confirms if the complementation data corresponding to the defective data is recorded in said complementation-data record area, on the basis of the confirmed address information, and in a case where the complementation data is not recorded, said control means requests the recovery server to transmit the complementation data, on the basis of the recovery-server network address detected from said network address database and then acquires the complementation data through the communication network;
   said control means records the acquired complementation data in said data record area in linkage with said database for the defective data;
   in a case where the address information of the defective data is contained in that area of the optical disc which is to be read out from this time forth, said control means complements the content data with the complementation data recorded in said complementation-data record area beforehand or with the complementation data acquired from the recovery server; and
   when said control means has failed to read out the data of the optical disc a predetermined number of times or for a predetermined time period, it recognizes the data of the corresponding part as unreadable defective data and then records the optical disc address of the defective data in said database for the defective data, together with the identification information of the optical disc.

6. A data complementation method for an optical disc in which unreproducible defective data of the optical disc whose data have become partly unreadable is complemented and reproduced, comprising:
   a defective-data confirmation step of searching a database for defective data, in which addresses of unreadable defective data on the optical disc are stored for respective disc identification information items, on the basis of the identification information of the optical disc before the reproduction in a reproduction mode of the optical disc, so as to confirm if the address information of the defective data exists in that area of the optical disc which is to be read out from this time forth;

a complementation-data confirmation step of confirming if complementation data corresponding to the defective data is recorded in a complementation-data record area in which complementation data corresponding to the defective data and linked with the database for the defective data are recorded, on the basis of the address information confirmed at said defective-data confirmation step;

a complementation-data transmission request step of requesting a recovery server to transmit the complementation data, on the basis of a network address of the recovery server as has been detected from a network address database which stores therein network addresses of recovery servers arranged on a communication network and bears complementation data;

a complementation-data acquisition step of acquiring the complementation data through the communication network;

a complementation-data record step of recording the complementation data acquired at said data acquisition step, in the complementation-data record area in linkage with the database for the defective data;

a data complementation step of complementing the content data with the complementation data previously recorded in the complementation-data record area or with the complementation data acquired from the recovery server, in a case where the address information of the defective data is contained in that area of the optical disc which is to be read out from this time forth; and a database record step of recognizing the data of the corresponding part as unreadable defective data when the readout of the data of the optical disc has failed a predetermined number of times or for a predetermined time period, and then recording the optical disc address of the defective data in the database for the defective data, together with the identification information of the optical disc.

* * * * *